(12) United States Patent
Campbell, Jr. et al.

(10) Patent No.: US 7,827,122 B1
(45) Date of Patent: Nov. 2, 2010

(54) DATA MINING OF UNFILTERED CONTROLLER DATA

(75) Inventors: John T. Campbell, Jr., Bridgeville, PA (US); Mark A. Glavach, Slippery Rock, PA (US); Scott A. Miller, Oakdale, PA (US); Keith A. Overstreet, Pittsburgh, PA (US); Randall P. Sadowski, Hookstown, PA (US); David T. Sturrock, Evans City, PA (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 66 days.

(21) Appl. No.: 11/371,433

(22) Filed: Mar. 9, 2006

(51) Int. Cl.
*G06F 15/18* (2006.01)
(52) U.S. Cl. .............................. 706/12; 717/151; 705/37
(58) Field of Classification Search .................... 706/12; 705/37; 707/1
See application file for complete search history.

(56) References Cited

U.S. PATENT DOCUMENTS

| | | | |
|---|---|---|---|
| 6,397,114 B1 | 5/2002 | Eryurek et al. | |
| 6,421,571 B1 | 7/2002 | Spriggs et al. | |
| 6,496,751 B1 | 12/2002 | Salvo et al. | |
| 6,529,780 B1 | 3/2003 | Soergel et al. | |
| 6,556,956 B1 | 4/2003 | Hunt | |
| 6,795,798 B2 | 9/2004 | Eryurek et al. | |
| 6,985,779 B2 | 1/2006 | Hsiung et al. | |
| 2002/0029207 A1* | 3/2002 | Bakalash et al. | 707/1 |
| 2005/0144114 A1* | 6/2005 | Ruggieri et al. | 705/37 |
| 2006/0149407 A1* | 7/2006 | Markham et al. | 700/108 |
| 2007/0078536 A1* | 4/2007 | Gordon et al. | 700/83 |
| 2007/0079355 A1* | 4/2007 | Chand et al. | 726/2 |

\* cited by examiner

*Primary Examiner*—Donald Sparks
*Assistant Examiner*—Kalpana Bharadwaj
(74) *Attorney, Agent, or Firm*—Turocy & Watson LLP; William R. Walbrun; John M. Miller

(57) ABSTRACT

A data analysis system for utilization in an industrial environment comprises an aggregation component that aggregates data from multiple controllers on a factory floor. An analysis component performs data mining on the aggregated data to determine one of correlations between variables within the aggregated data and trends within the aggregated data. For example, the controllers can be programmable logic controllers, robotic controllers, and the like.

26 Claims, 12 Drawing Sheets

DATA MINING OF UNFILTERED CONTROLLER DATA

TECHNICAL FIELD

The claimed subject matter relates generally to industrial processes and, more particularly, to performing data mining on unfiltered data from a plurality of controllers to determine correlations between variables and/or trends in the data.

BACKGROUND

Due to advances in computing technology, businesses today are able to operate more efficiently when compared to substantially similar businesses only a few years ago. For example, networking enables employees of a company to communicate instantaneously by email, quickly transfer data files to disparate employees, manipulate data files, share data relevant to a project to reduce duplications in work product, etc. Furthermore, advancements in technology have enabled factory applications to become partially or completely automated. For instance, operations that once required workers to put themselves proximate to heavy machinery and other various hazardous conditions can now be completed at a safe distance therefrom.

Further, imperfections associated with human action have been minimized through employment of highly precise machines. Many of these factory devices supply data related to manufacturing to databases or web services referencing databases that are accessible by system/process/project managers on a factory floor. For instance, sensors and associated software can detect a number of instances that a particular machine has completed an operation given a defined amount of time. Further, data from sensors can be delivered to a processing unit related to system alarms. Utilizing such data, industrial applications are now becoming partially and/or completely automated.

While various advancements have been made with respect to automating an industrial process, utilization and design of controllers has been largely unchanged. In more detail, industrial controllers have been designed to efficiently undertake real-time control. For instance, conventional industrial controllers receive data from sensors and, based upon the received data, control an actuator, drive, or the like. These controllers recognize a source and/or destination of the data by way of a symbol and/or address associated with source and/or destination. More particularly, industrial controllers include communications ports and/or adaptors, and sensors, actuators, drives, and the like are communicatively coupled to such ports/adaptors. Thus, a controller can recognize device identify when data is received and further deliver control data to an appropriate device.

Controllers can additionally generate a significant amount of data relating to a process. For example, controllers output statuses of sensors, drives, actuators, and the like. Further, scheduling data can be output from the controller, which may be indicative of how a work order is proceeding through an industrial factory, whether additional work orders may be accepted, and the like. Moreover, alarm data can be generated and output at a controller, events leading up to the alarm as experienced by the controller, and other suitable data can be generated and output by the controller.

Oftentimes, data from controllers is analyzed to determine a source of a problem, to determine scheduling information, and the like. Conventionally, however, controllers are fitted with a small amount of data storage (e.g., in the order of two gigabytes). If data is desirably retained beyond the two gigabytes, an operator or operators must determine which data is desirably kept for a long period of time, and the remainder of the data is deleted. Thus, for instance, if it is desirable to monitor data for scheduling, scheduling data for such controller can be retained within local storage of the controller until storage capacity is reached while other data is deleted. After a certain amount of time passes or when storage capacity of the controller is reached, data from the controller can be archived. If data is desirable analyzed, then such analysis is performed with respect to data within a particular controller.

SUMMARY

The following presents a simplified summary of the claimed subject matter in order to provide a basic understanding of some aspects described herein. This summary is not an extensive overview, and is not intended to identify key/critical elements or to delineate the scope of the claimed subject matter. Its sole purpose is to present some concepts in a simplified form as a prelude to the more detailed description that is presented later.

Performing data mining on unfiltered data from a plurality of controllers can enable determination of patterns in data, determination of correlations between variables in data, determination of trends in data, and the like. To enable such data mining, unfiltered data from a plurality of controllers can be aggregated and thereafter mined. Typically, controllers are associated with local storage, such that control programs and certain process data can be stored locally for a particular period of time. Amount of storage capacity currently being utilized to retain data can be monitored and data can be pulled from the controllers as a function of the monitoring. For instance, when 90% of local storage associated with a controller is being utilized data can be pulled from the controller (e.g., such that only 40% of local storage is being utilized). It is to be understood that these percentages are simply utilized to provide examples of how data can be pulled from one or more controllers. Additionally or alternatively, the controllers can be associated with sufficient intelligence to self-monitor data storage space, such that the controllers can push data to a data repository. Accordingly, it can be discerned that any suitable manner for receiving/obtaining data from multiple controllers is contemplated.

Unfiltered data (raw data) that is received from the controllers can then be aggregated into one or more data repositories. In contrast to conventional data collection systems, wherein operators/engineers determine which data is important and thus filter out data deemed non-important, collection of unfiltered data includes collection of all data that is generated by controllers and/or is output from controllers. Upon the data being aggregated, such data can be mined to determine correlations between variables within the data, locate patterns within the data, and the like. Such data mining can be useful, for instance, in determining a source of an error or alarm within an industrial process. For example, assumptions can be made regarding cause of an alarm given localized data (e.g., data associated with a single controller). If, however, a larger sample of data is analyzed (e.g., from multiple controllers), it can be discerned that a sequence of actions prior to the occurrence of the alarm is in actuality a root cause of the alarm. Additionally, a control process can be intelligently updated based upon results of data mining of unfiltered data associated with a plurality of controllers.

Moreover, a simulation engine can be dynamically updated based at least in part upon results of data mining. Simulations are often provided when setting up new industrial processes to estimate how a process will operate given certain equipment and parameters. After running a simulation for a first time, however, such simulations are typically shelved and quickly become obsolete. If robust data mining is performed, however, results of such data mining can be utilized to update the simulation engine to provide more accurate simulations of processes. These simulations can be utilized in a predictive manner. For example, given particular trends, a simulation can indicate how long before a work order will be completed.

To the accomplishment of the foregoing and related ends, certain illustrative aspects of the claimed subject matter are described herein in connection with the following description and the annexed drawings. These aspects are indicative, however, of but a few of the various ways in which the principles of the claimed subject matter can be employed and such subject matter is intended to include all such aspects and their equivalents. Other advantages and novel features will become apparent from the following detailed description of the invention when considered in conjunction with the drawings.

DETAILED DESCRIPTION

Figure 1:
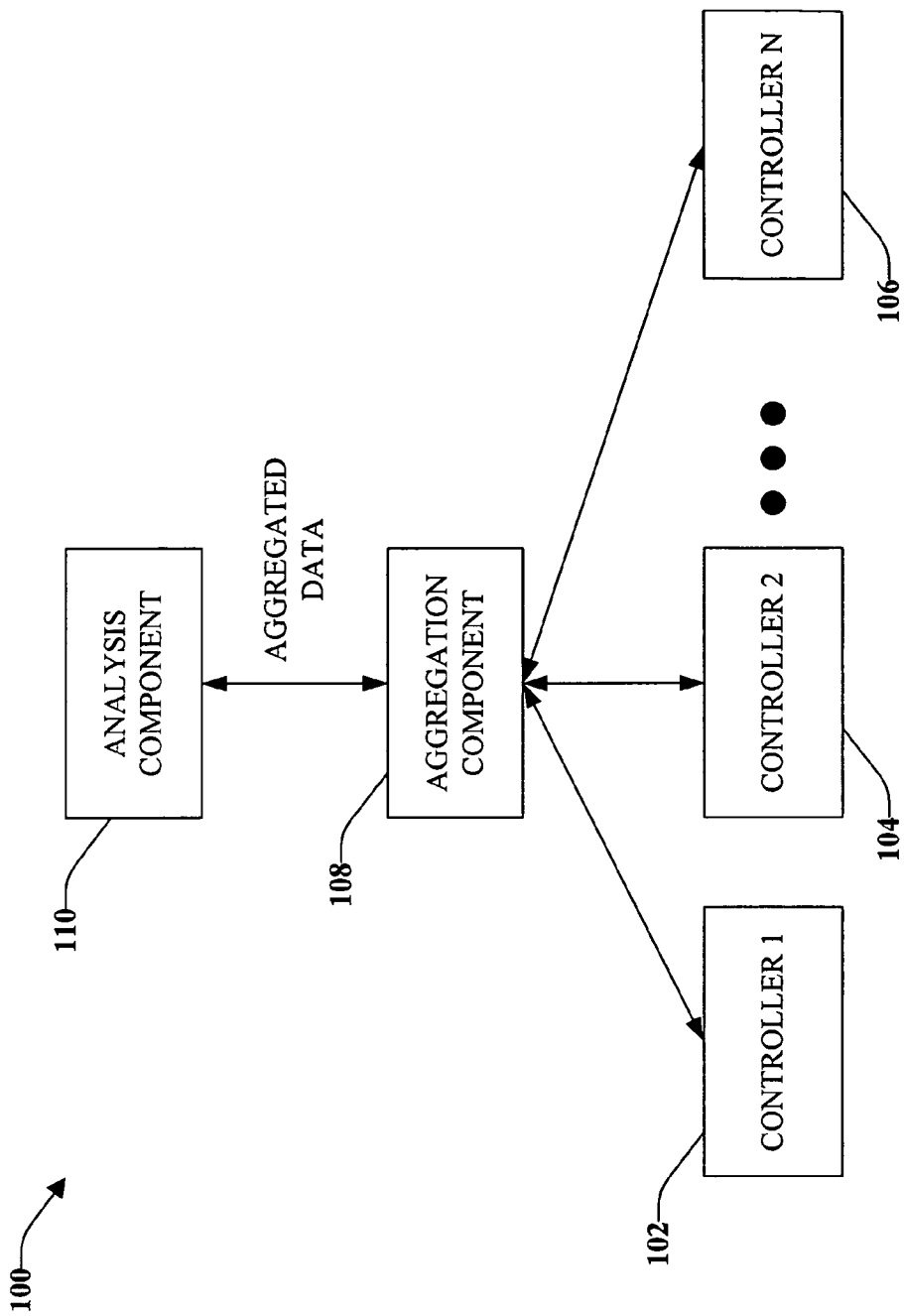
FIG. 1 is a high level block diagram of a data analysis system for utilization in an industrial environment.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that such matter can be practiced without these specific details. In other instances, well-known structures and devices are shown in block diagram form in order to facilitate describing the invention.

As used in this application, the terms "component" and "system" are intended to refer to a computer-related entity, either hardware, a combination of hardware and software, software, or software in execution. For example, a component may be, but is not limited to a process running on a processor, a processor, an object, an executable, a thread of execution, a program, and a computer. By way of illustration, both an application running on a server and the server can be a component. One or more components may reside within a process and/or thread of execution and a component may be localized on one computer and/or distributed between two or more computers. The word "exemplary" is used herein to mean serving as an example, instance, or illustration. Any aspect or design described herein as "exemplary" is not necessarily to be construed as preferred or advantageous over other aspects or designs.

Furthermore, aspects of the claimed subject matter may be implemented as a method, apparatus, or article of manufacture using standard programming and/or engineering techniques to produce software, firmware, hardware, or any combination thereof to control a computer to implement various aspects of the subject invention. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., card, stick, key drive, etc.). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of what is described herein.

Now referring to the drawings, FIG. 1 illustrates an industrial data analysis system 100 that can be utilized within a factory environment. The system 100 includes a plurality of controllers 102-106 that are employed in connection with an industrial process. For example, one or more of the controllers 102-106 can be programmable logic controllers, robotic controllers, or any other suitable industrial controllers. Additionally, the controllers 102-106 can be geographically dispersed, can be associated with different processes, and the like. In a detailed example, a subset of the controllers 102-106 can be located on a same rack, on different racks, dispersed throughout a process, dispersed throughout several processes, dispersed throughout a factory, and/or dispersed throughout several factories. Thus, the plurality of controllers 102-106 can be related to one another in any suitable manner. Still further, while the plurality of controllers 102-106 is shown as comprising more than two controllers, it is understood that the number of controllers 102-106 can be any integer number greater than one.

The plurality of controllers 102-106 can be associated with an aggregation component 108, wherein the aggregation component 108 is utilized to receive and aggregate unfiltered data from the plurality of controllers 102-106. In contrast to conventional data collection from controllers, which is limited to a single controller and is associated with filtered data, the aggregation component 108 can receive unfiltered data from each of the controllers 102-106 and aggregate such data. Thus, a more robust data representation of a process, factory, set of processes, set of factories, and the like can be generated through utilization of the aggregation component 108. The aggregation component 108 can periodically poll the controllers 102-108 in connection with aggregating unfiltered data from such controllers 102-106, can receive data in real-time as it is output by the controllers 102-106 and aggregate such data, can receive data pushed from the controllers 102-106, and/or the like.

In a detailed example, the aggregation component 108 can be informed of and/or determine an amount of data storage that is associated with each of the controllers 102-106. If a controller approaches capacity (e.g., a threshold percentage of storage capacity of the controller is utilized), the aggregation component 108 can pull data from such controller. In another example, a controller may have sufficient intelligence to self-monitor available storage capacity and push data once such controller determines that a particular amount of storage capacity is being utilized. Thus, any suitable manner for collecting and aggregating unfiltered data from multiple controllers is contemplated by the inventors and intended to fall under the scope of the hereto-appended claims.

The system 100 further includes an analysis component 110 that can perform data mining on the aggregated data to determine correlations between variables within the data, determine trends within the aggregated data, etc. Data mining involves automatically searching stores of data for various patterns, and can employ computational techniques from statistics, machine learning, pattern recognition, and the like. If the analysis component 110 does not include an underlying theoretical model, such analysis component 110 may utilize stepwise regression methods (such as Monte Carlo methods). Additionally or alternatively, the analysis component 110 can include a theoretical model that facilitates pattern recognition, such as a Bayesian Model. As will be understood by one skilled in the art, however, any suitable model can be employed in connection with the analysis component 110 to aid in performance of data mining on the aggregated data.

Performing data mining on unfiltered aggregated data from multiple controllers can enable determination of cause of errors, comparison of efficiencies between lines or factories, and the like, wherein such actions were heretofore implausible and/or inefficient. For example, conventionally, data that is analyzed with respect to a controller relates solely to such controller, and the data is filtered based upon an operator's (or plant engineer's) beliefs regarding which data is of utmost importance. Remaining data can then be analyzed; however, results of such analysis may be misleading. For instance, by analyzing data from a single controller a determination may be made regarding cause of an error or alarm. In actuality, however, a series of events associated with disparate controller(s) that precede occurrence of the alarm may be the underlying cause of such alarm. Utilizing the system 100, the analysis component 110 can perform data mining on aggregated data from multiple controllers to better determine actual source of an error/alarm. In a similar example, from analysis of data from one controller it may seem that a certain actuator is operating at a speed that is below a desired threshold. Upon analyzing aggregated, unfiltered data from multiple controllers, however, it may be determined that a disparate actuator (associated with another controller) may be causing the actuator to operate inefficiently.

Figure 2:
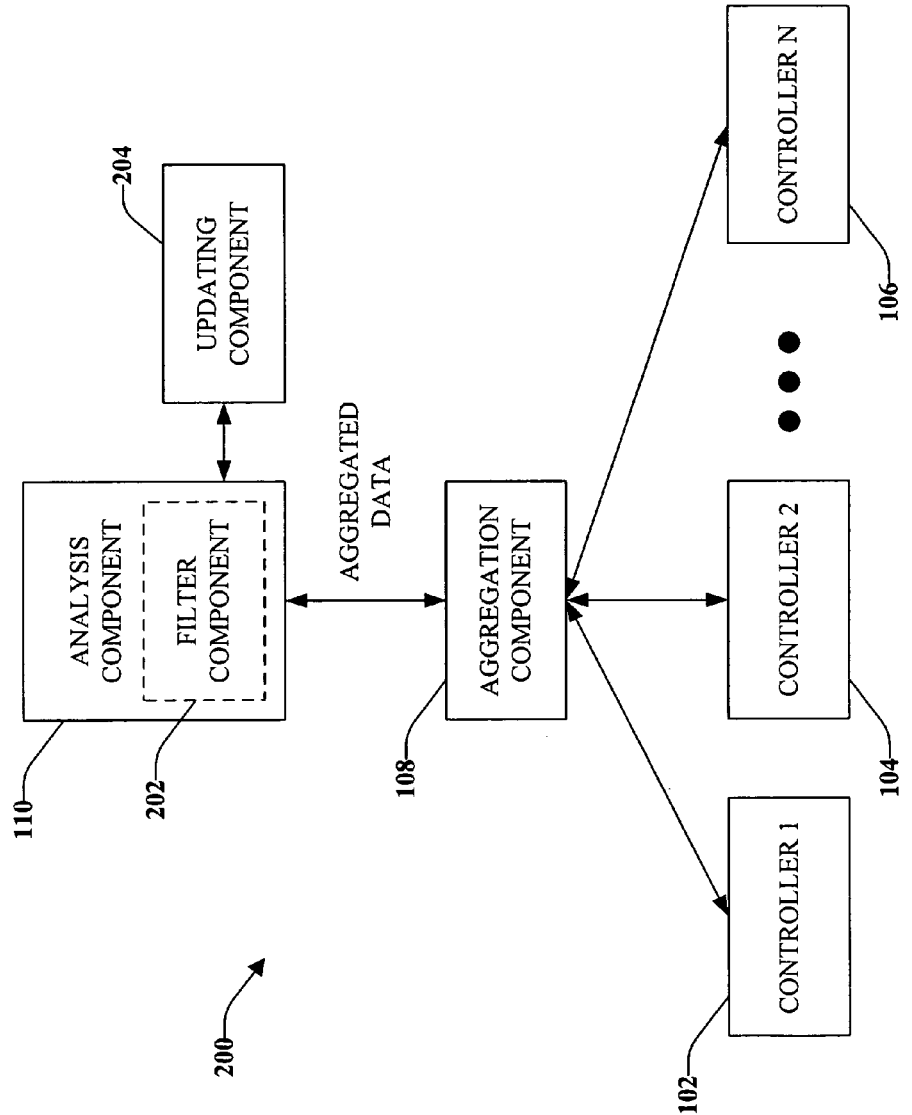
FIG. 2 illustrates a system that facilitates updating a controller given results of data mining undertaken upon unfiltered data associated with a plurality of controllers.

Turning now to FIG. 2, a data analysis system 200 for utilization in an industrial automation environment is illustrated. The system 200 includes the plurality of controllers 102-106 that are employed in connection with controlling one or more processes within one or more factories. The aggregation component 108 aggregates raw (unfiltered) data from the controllers 102-106 through any suitable aggregation means, and the analysis component 110 can thereafter perform data mining upon the aggregated data. The analysis component 110 can include a filter component 202 that filters the aggregated data based upon time of creation of data therein. In this manner, the analysis component 110 can perform data mining on a particular range within a time series. In a specific example, the aggregation component 108 can aggregate data such that a week's worth of data is available to the analysis component 110. If an alarm occurs, however, it may be desirable to perform data mining only over a few hours worth of data. The filter component 202 can filter data that is analyzed by the analysis component 110 based upon time ranges associated with data. These time ranges can be determined through utilization of time stamps, can be embedded within the data, can be inferred based upon location of data within a data repository, or any other suitable manner of determining timing information associated with the data.

Parameters relating to the time ranges can be explicitly provided by an operator and/or explicitly inferred based upon an event and/or context. For instance, some events may be associated with data mining over a larger range of time series data than other events. Further, context, such as operator identity, time of day, geographic location, and the like can have an effect on a range of time series data analyzed by the analysis component 110. Rules relating to time ranges given particular events and/or contexts can be associated with the filter component 202 and accessed when data mining is desired.

The system 200 can additionally include an updating component 204 that can update contents (e.g., control parameters) associated with the controllers 102-106 based at least in part upon results of data mining performed by the analysis component 110. For example, the analysis component 110 can determine that a certain sequence of events recognized and/or caused by one or more of the controllers 102-106 results in machine malfunction and/or process downtime. Upon recognizing that such sequence has begun, the analysis component 110 can inform the updating component 204 that a process should be altered and/or temporarily ceased to enable repair/maintenance of a machine. Any suitable update, however, that is based upon results of data mining undertaken by the analysis component 110 is contemplated.

Figure 3:
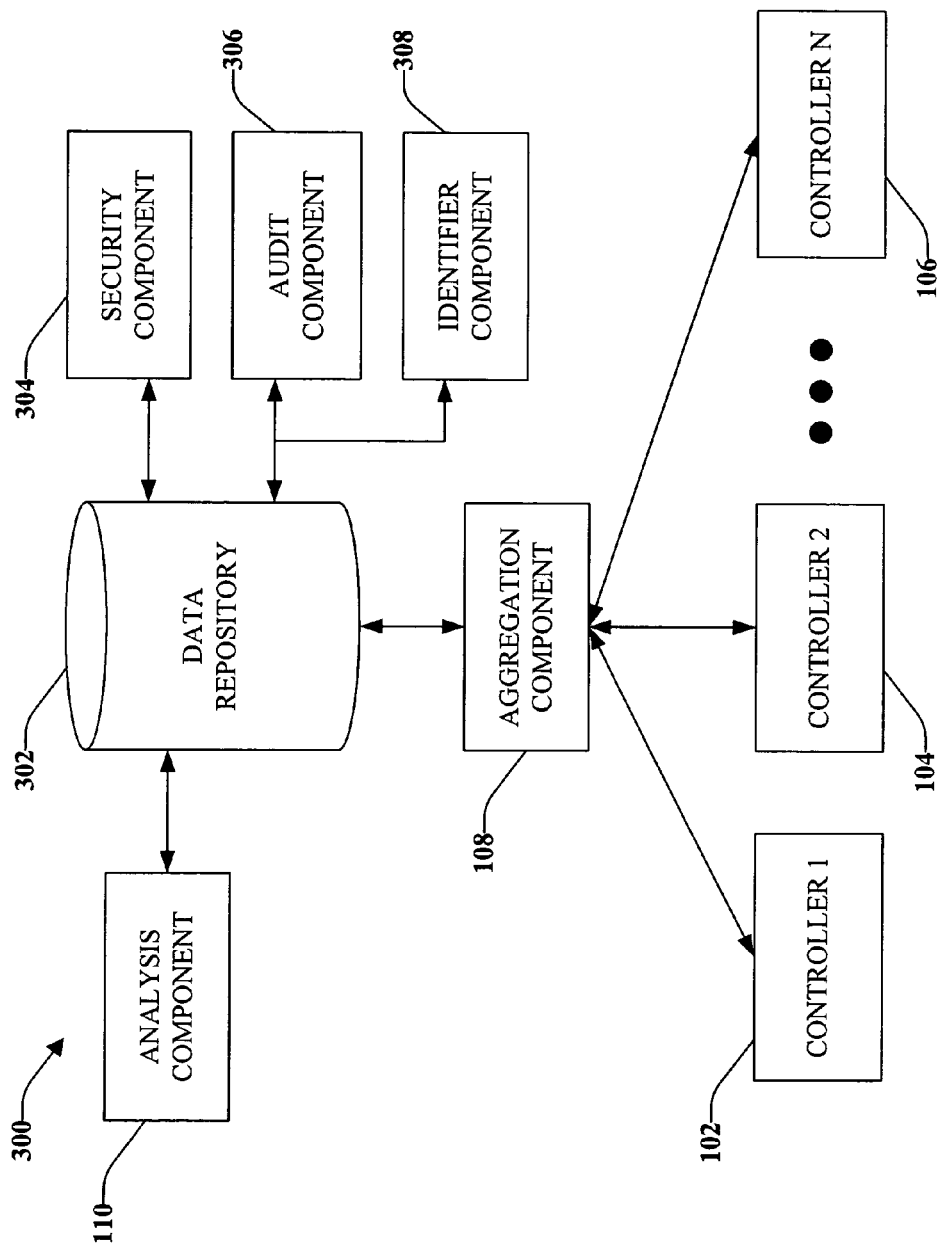
FIG. 3 illustrates a system that facilitates generation of audit logs.

Referring now to FIG. 3, an industrial automation data analysis system 300 is illustrated. The system 300 includes the plurality of controllers 102-106, wherein such controllers can include programmable logic controllers, robotic controllers, or any other suitable controllers. The aggregation component 108 can be communicatively coupled to the controllers 102-106 and can aggregate data generated and/or received by the controllers 102-106. For example, as described above, the aggregation component can pull data from the controllers 102-106, the controllers 102-106 can push data to the aggregation component 108, etc. Aggregated data can then be provided to a data repository 302. The data repository 302 can include, for example, either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable programmable ROM (EEPROM), or flash memory. Volatile memory can include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM). The data repository 302 is intended to comprise, without being limited to, these and any other suitable types of data storage devices/parameters. In addition, it is to be appreciated that the data repository 302 can be a server, a database, a hard drive, and the like.

The analysis component 110 can access the data repository 302 and perform data mining upon at least a subset of the data stored therein. As stated above, data residing within the data repository 302 can be unfiltered data, meaning that data from the controllers 102-106 has not been altered. The data repository 302 can be associated with a security component 304 that ensures that an individual or entity requesting access to data residing within the data repository 302 is authorized for the requested access. For instance, an individual may have read-only access privileges to the data repository 302, and the security component 304 can enforce such read-only privileges (e.g., by prohibiting the individual from adding or removing data from the data repository 302). In another example, an individual or entity may have read-write privileges, and upon the security component 304 confirming identity of the individual such individual can read from and write to the data repository 302. Thus, a person charged with archiving data within the data repository 302 would need to have read-write privileges with respect to such repository 302, and the security component 304 could, upon determining the person's identity, allow the individual to archive data. The security component 304 can utilize any suitable means for authenticating user identity, inclusive of but not limited to usernames, passwords, personal identification numbers (PINs), voice analysis and other biometric indicia (such as fingerprint scans, retina scans, etc.), keycards, and the like. Upon determining identification, the security component 304 can access a database (not shown) that associates access privileges with their identification, wherein the access privileges can also depend upon context (geographic location of a user, time of day, day of week, etc.).

The system 300 can additionally include an audit component 306 that can access the data repository 302 and replay data therein to generate an audit log. The audit log can include identity of controllers, processes, machines, operators, and any other suitable data that can be included within audit logs. Moreover, the audit component 306 can generate audit logs with respect to particular portions in time, a subset of the plurality of controllers 102-106, a machine that is associated with multiple controllers, and the like. Such selective auditing can be accomplished by way of analyzing parameters embedded within data. Additionally, an identifier component 308 can be employed to locate data within the data repository 302 associated with certain controller(s), and inform the audit component 306 to generate an audit log with respect to such controller(s). For example, data generated/output by the controller 102 can include indicia that can be utilized to identify such controller. The identifier component 308 can analyze the data and determine such identity, and the audit component 306 can generate an audit log with respect to the controller 102 (e.g., can replay data associated with the controller 102).

Figure 4:
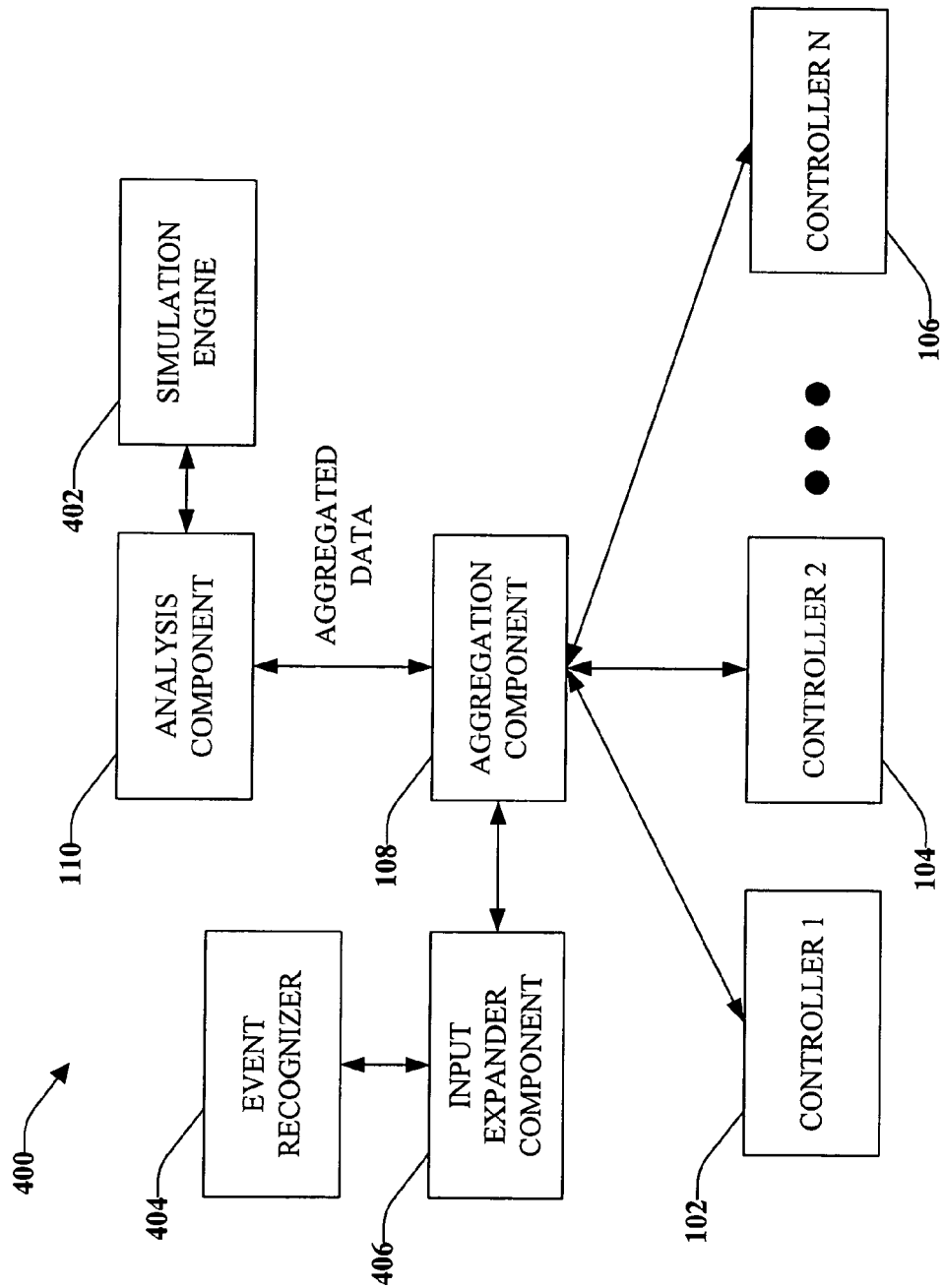
FIG. 4 illustrates a system that facilitates updating a simulation engine based at least in part upon data mining undertaken upon aggregated data from a plurality of controllers.

Now referring to FIG. 4, a data analysis system 400 is illustrated. The system 400 includes the plurality of controllers 102-106 and the aggregation component 108 that aggregates unfiltered data generated/output by the controllers 102-106. The system 400 additionally includes the analysis component 110 that performs data mining upon the aggregated data to determine correlations between variables within the data, locates patterns, determines trends, and the like. The system 400 can additionally include a simulation engine 402 that can be employed to generate simulations of processes associated with the multiple controllers 102-106. Conventionally, simulations are built prior to setting up a control process, and after such process is in operation the simulation is not utilized again. The simulation engine 402, however, can be updated based at least in part upon data mining performed by the analysis component 110 upon the aggregated data. For instance, the analysis component 110 can determine that certain actuators are operating at specific speeds given particular contexts through performance of data mining on the aggregated data. When asked to simulate the process into the future, the simulation engine 402 can utilize such determinations in generating a robust and realistic simulation. In a detailed example, without aid of the analysis component 110, the simulation engine 402 can estimate that a process can output X number of products at Y cost. When provided with data from the analysis component 110, however, the simulation engine 402 can generate simulations that closely resemble actual outcomes due to data received relating to the process.

The system 400 can additionally include an event recognizer 404 that recognizes occurrences of particular events upon a factory floor, such as an alarm, an operator pressing a button, machine shut-down, and the like. Upon the event recognizer 404 recognizing occurrence of the event, an input expander component 406 can determine what data associated with the controllers 102-106 should be provided to the analysis component 110. For example, the controllers 102-106 can retain a certain amount of data, and the input expander component 406 can automatically determine which of the retained data should be aggregated and provided to the analysis component 110. In such a manner, an input set can be expanded beyond that associated with conventional analysis of controller-related data.

Figure 5:
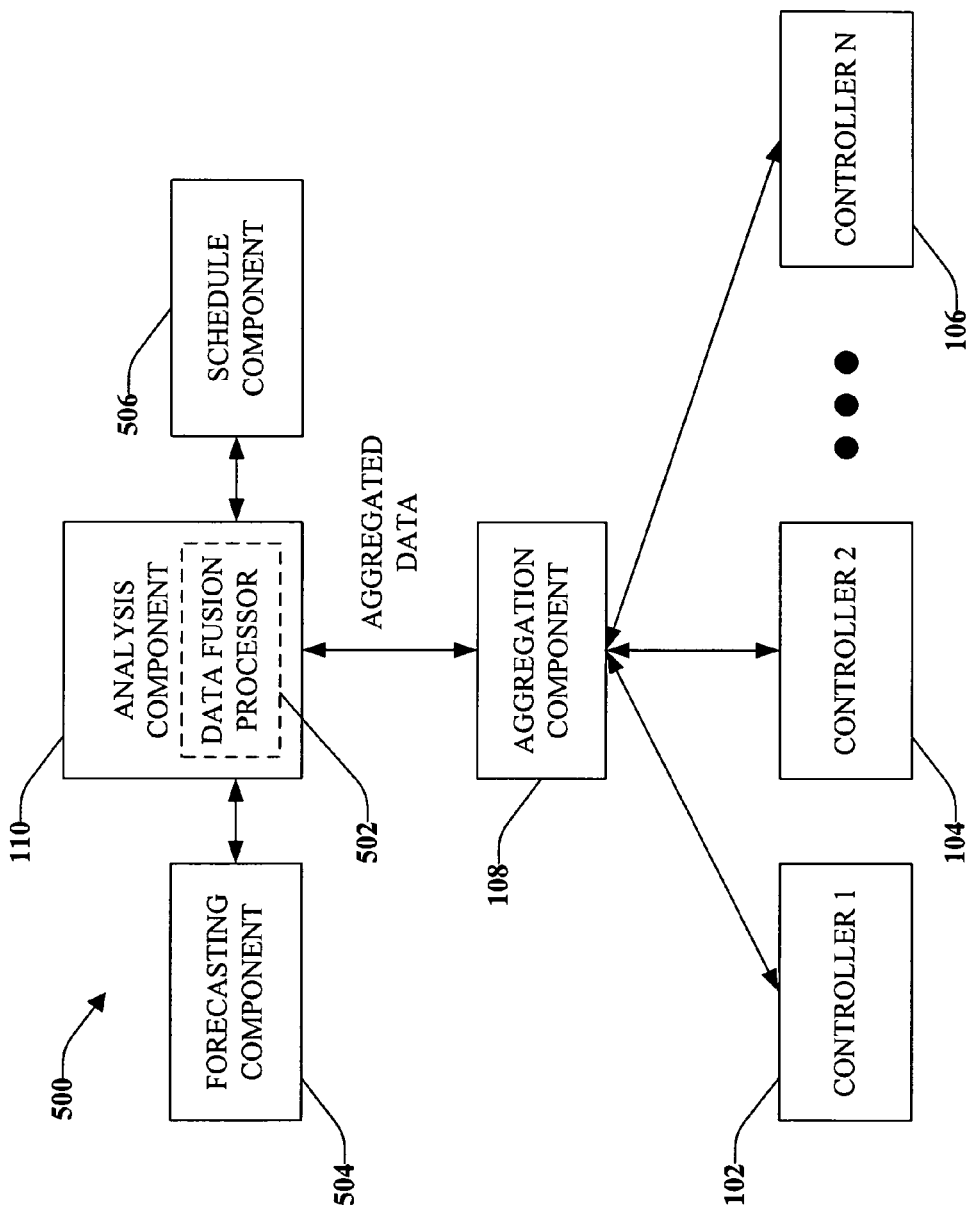
FIG. 5 is a block diagram of a system that schedules maintenance based upon results of data mining of aggregated data.

Turning now to FIG. 5, an industrial data analysis system 500 is illustrated. The system 500 includes the controllers 102-106, wherein raw data from such controllers is aggregated by the aggregation component 108. As described above, the aggregation component 108 can pull data from the controllers 102-106, can receive data as it is output/generated by the controllers 102-106, can receive data pushed by the controllers 102-106, etc. The analysis component 110 can then perform data mining on the aggregated data to determine correlations between variables within the data, locate trends within the data, and the like. To aid in performing the data mining, the analysis component 110 can include a data fusion processor 502 or other data fusion device. Data fusion enables combination of data from disparate sources such that resulting information is somehow better than would be possible when data sources are reviewed individually, wherein the term "better" can mean more complete, more accurate, and/or more representative of a process or processes.

The system 500 can additionally include a forecasting component 504 that can forecast one or more events based at least in part upon data mining undertaken by the analysis component 110. For example, the analysis component 110 can recognize particular trends in data aggregated by the aggregation component 108 and provide such trends to the forecasting component 504. The forecasting component 504 can then extrapolate an event given the trends. In a detailed example, a trend located by the analysis component 110 can indicate that an actuator's ability to alter states is diminishing. The forecasting component 504 can extrapolate such data and estimate/infer when the actuator will fail. It is understood, however, that the forecasting component 504 can undertake any suitable forecasting.

As used herein, the term "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification schemes and/or systems (e.g., support vector machines, neural networks, expert systems, Bayesian belief networks, fuzzy logic, data fusion engines . . . ) can be employed in connection with performing automatic and/or inferred action.

The system 500 further includes a scheduler component 506 that, like the forecasting component 504, can infer when to schedule maintenance for one or more devices. Additionally, the scheduler component 506 can schedule maintenance in light of other activities on a schedule. In particular, the scheduler component 506 can schedule maintenance of one or more devices in view of a combination of trends/patterns determined by the analysis component 110, availability of maintenance personnel, current and expected work orders (e.g., it would be undesirable to schedule maintenance of a device during prime operating hours), identity of maintenance personnel (certain personnel may be more able to maintain certain devices), etc. Thus, the scheduler component 506 can contemplate various factors in connection with scheduling maintenance with respect to one or more industrial devices.

Figure 6:
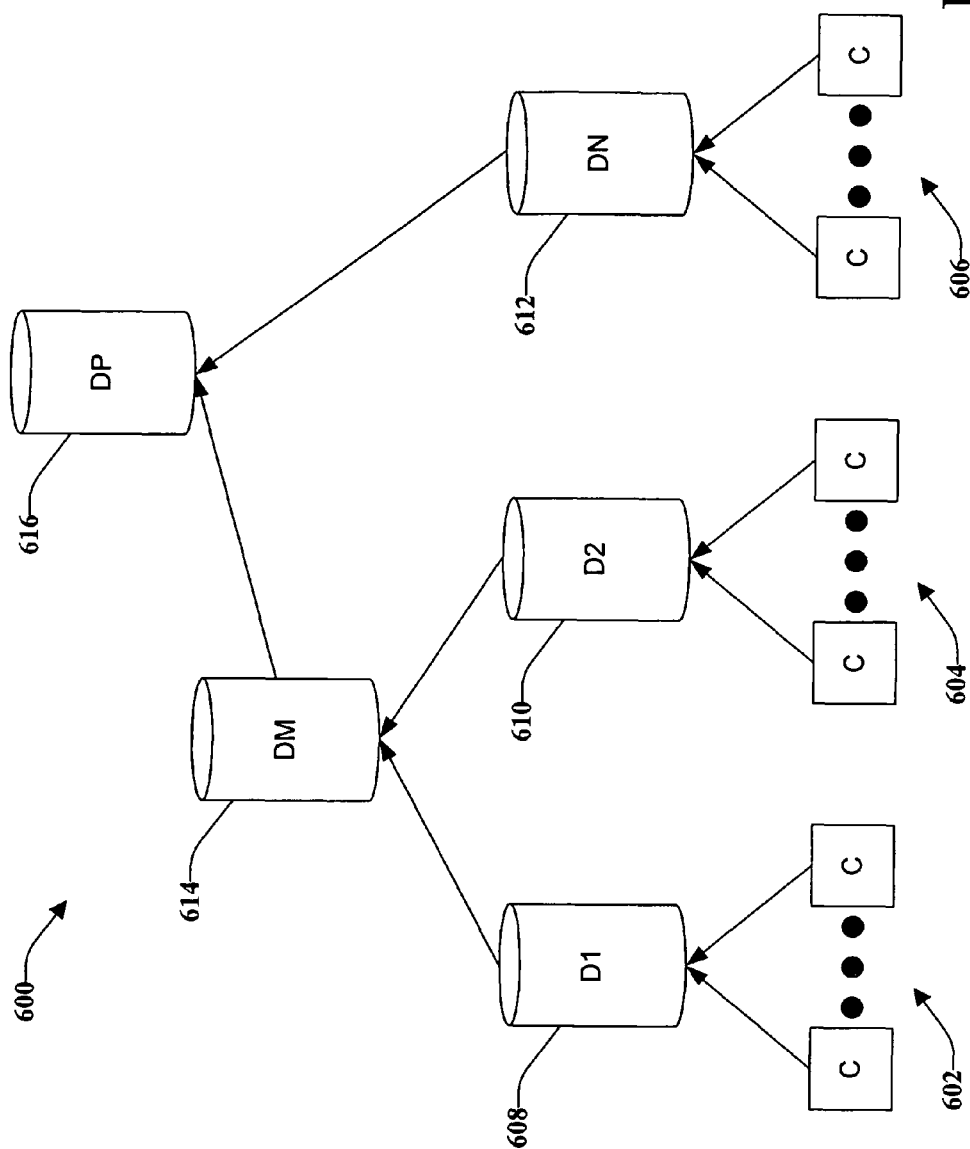
FIG. 6 is a hierarchical arrangement of data repositories, wherein data from a plurality of controllers can be aggregated upwards throughout the hierarchy.

Now referring to FIG. 6, an exemplary system 600 that facilitates data analysis in an industrial environment is illustrated. The system 600 includes several pluralities of controllers 602-606. As before, these controllers can include programmable logic controllers, robotic controllers, or any other suitable controllers. Each of the plurality of controllers 602-606 can be associated with a data repository. In more detail, the first plurality of controllers 602 can be associated with a first data repository 608, the second plurality of controllers 604 can be associated with a second data repository 610, and the Nth plurality of controllers 606 can be associated with an Nth data repository 612. Aggregation components (not shown) can be associated with each of the plurality of controllers 602-606, thereby enabling the first data repository 608 to include aggregated data relating to the first plurality of controllers 602, the second data repository 610 can include aggregated data from the second plurality of controllers 604, etc. Data mining algorithms/components (not shown) can then operate on data within the data repositories 608-612, such that localized trends/correlations between variables can be determined within respective data repositories.

In the exemplary system 600, the data repositories 608 and 610 feed into an Mth data repository 614. Thus, the data repository 614 includes aggregated data from both the first and second plurality of controllers 602-604. A Pth data repository 616 can be utilized to retain aggregated data from the Nth data repository 612 and the Mth data repository 614, such that the Pth data repository 616 includes data from each plurality of controllers 602-606. Data mining algorithms can operate on any or all of the data repositories 608-616 to determine correlations between variables within such data repositories. The repositories 608-616 can be arranged hierarchically according to process, machine, line, factory, or any other suitable hierarchical arrangement that may aid in analysis of data. Additionally, for instance, data within the data repositories 608-612 can be unfiltered (raw) data from the pluralities of controllers 602-606. As such data is fed up through the hierarchy, certain data can be filtered. Alternatively, the data can remain raw throughout the system 600.

Figure 7:
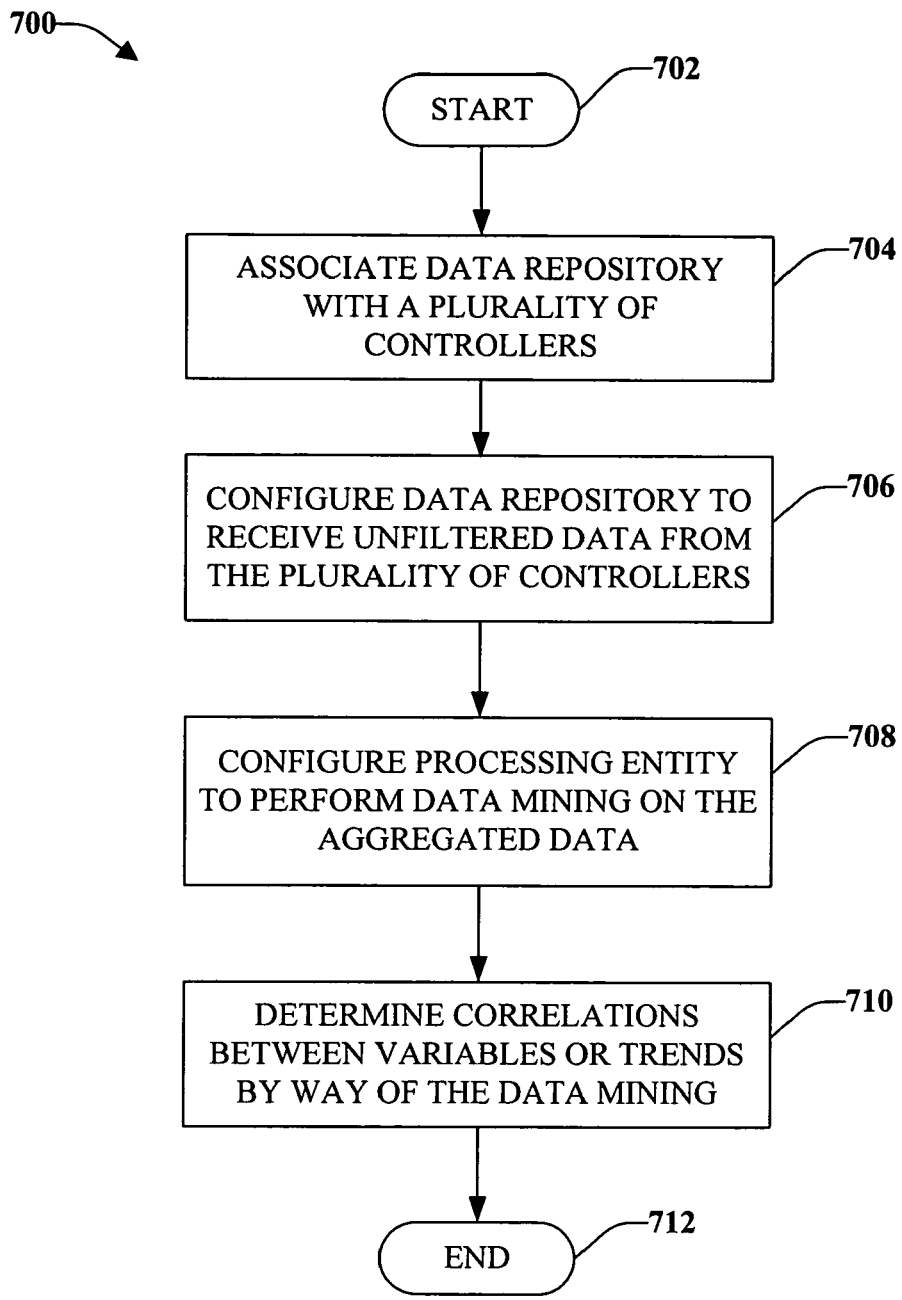
FIG. 7 is a representative flow diagram of a methodology for performing data mining on unfiltered, aggregated data from a plurality of controllers.
Figure 8:
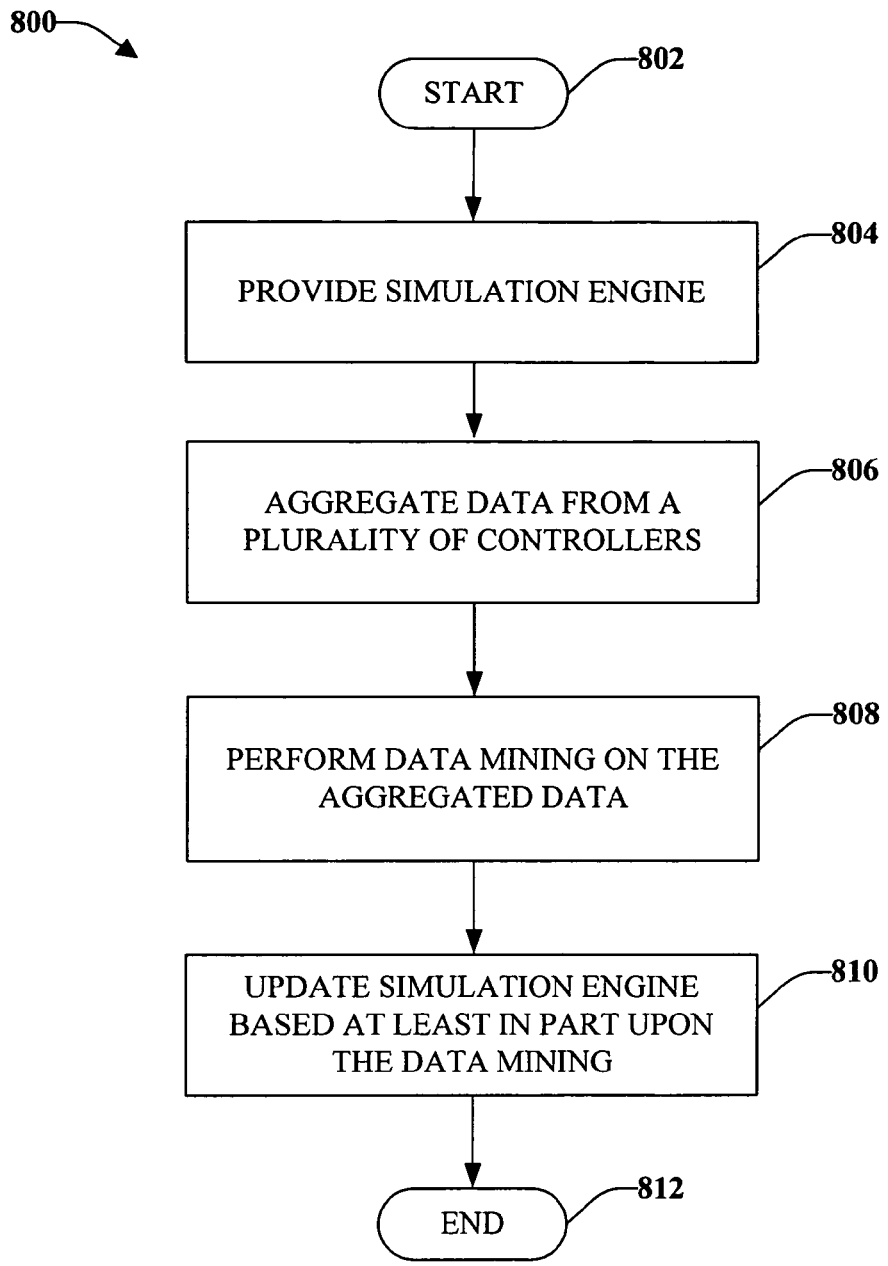
FIG. 8 is a representative flow diagram of a methodology for updating a simulation engine based upon results of data mining performed on aggregated data from a plurality of controllers.
Figure 9:
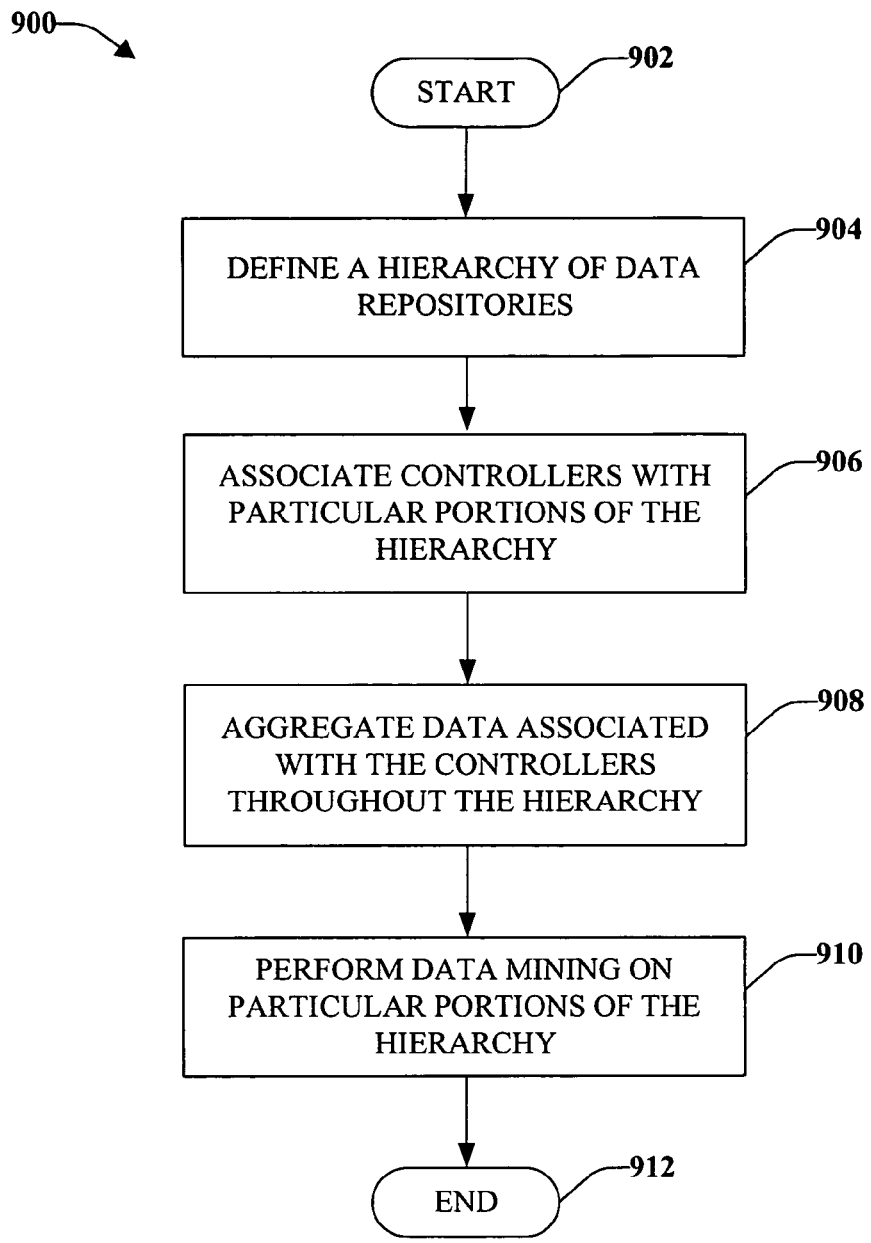
FIG. 9 is a representative flow diagram of a methodology for performing data mining on particular portion of a hierarchy of data repositories.

Referring to FIGS. 7-9, methodologies in accordance with various aspects of the claimed subject matter are illustrated. While, for purposes of simplicity of explanation, the methodologies are shown and described as a series of acts, it is to be understood and appreciated that the claimed subject matter is not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the claimed subject matter. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Turning specifically to FIG. 7, a methodology 700 for analyzing data from a plurality of controllers is illustrated. The methodology 700 starts at 702, and at 704 a data repository is associated with a plurality of controllers. For example, the plurality of controllers can include programmable logic controllers, robotic controllers, or any other suitable controllers. The data repository can be communicatively coupled to the plurality of controllers. For instance, the data repository can be wirelessly coupled to at least one of the plurality of controllers, can be coupled through fiber lines, optical lines, or any other suitable manner of coupling the data repository to the controllers.

At 706, the data repository is configured to receive unfiltered data from the plurality of controllers. For example, aggregation algorithms can be associated with the data repository and/or the plurality of controllers to enable data to be aggregated from such controllers. In another example, data can be aggregated up hierarchically from the factory floor to, for example, an Enterprise Resource Planning system (ERP system). At 708, a processing entity is configured to perform data mining on the aggregated data, wherein any suitable pattern recognition algorithms and/or models can be employed in connection with aggregating the data. For instance, Bayesian Networks, Artificial Neural Networks, Support Vector Machines (SVMs), fuzzy logic, or any other statistical/pattern recognition models and/or algorithms can be employed to perform data mining on the aggregated data.

At 710, correlations are determined between variables within the data, trends are located within the data, patterns within the data are discerned, etc. This analysis can be useful in updating a control process, determining origin of an error, comparing processes, factories, machines, and the like. Thus, data mining can be employed to aid in rendering an industrial process more efficient than it would otherwise be. The methodology 700 completes at 712.

Turning now to FIG. 8, a methodology 800 for enhancing/updating a simulation engine in an industrial environment is illustrated. The methodology 800 starts at 802, and at 804 a simulation engine is provided. The simulation engine can be utilized to simulate one or more industrial processes, so as to aid in determining expectations with respect to the processes. For example, the simulation engine can simulate a process over time, such that throughput of the process can be reasonably estimated. At 806, data is aggregated from a plurality of industrial controllers. For instance, the aggregated data can conform to a hierarchically structured data model. Thus, rather than being associated with a flat namespace, data output/generated by the industrial controllers can be hierarchically structured. The data model can be based at least in part upon ISA S88, ISA S95, and/or a combination thereof. An exemplary depiction of one particular hierarchy that can correspond to a hierarchically structured data model is provided below.

At 808, data mining operations are performed upon the aggregated data. As described above, the data mining can be performed to determine correlations between variables within data, to recognize patterns existent within data, etc. At 810, the simulation engine is updated based at least in part upon results of the data mining. For instance, performance of data mining on unfiltered data can result in determining a particular trend. The simulation engine can then be provided with such trend, so as to enable the simulation engine to create more accurate simulations (predictions). The methodology 800 then completes at 812.

Referring now to FIG. 9, a methodology 900 for performing data mining on unfiltered controller data is illustrated. The methodology 900 begins at 902, and at 904 a hierarchy of data repositories is defined. One example of a hierarchy of data stores is illustrated and described with respect to FIG. 6. At 906, controllers are associated with particular portions of the hierarchy. For example, a plurality of related controllers (e.g., that are utilized to control a certain sub process) can be associated with a certain data repository within the hierarchy, and a second plurality of related controllers can be associated with a disparate data repository within the hierarchy. Controllers can be associated on a substantially similar "layer" of the hierarchy and/or can be spread throughout the hierarchy.

At 908, data from the controllers is aggregated upwards throughout the hierarchy. Data repositories at lower levels of the hierarchy, however, can retain at least a subset of data as it is aggregated upwards. At 910, data mining is performed upon data within data repositories that are associated with particular portions (layers) of the hierarchical arrangement of data repositories. Selective data mining based upon location of the data within a hierarchy enables localized patterns to be determined as well as global patterns. The methodology 900 then completes at 912.

Figure 10:
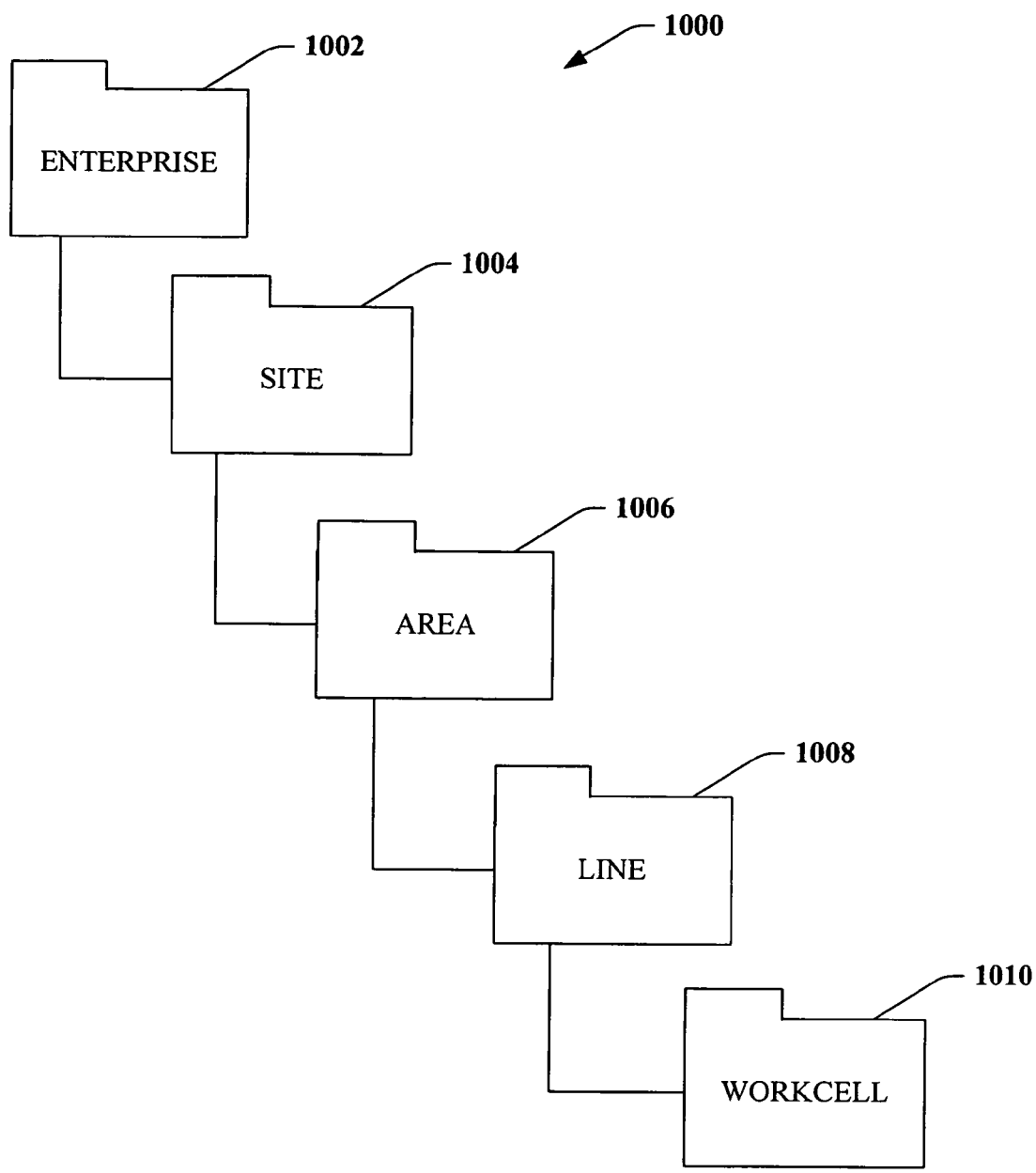
FIG. 10 is an exemplary hierarchical arrangement upon which a data model can be based.

Referring now to FIG. 10, an exemplary hierarchical structure 1000 which can be utilized in connection with the hierarchically structured data model alluded to herein is illustrated. For example, the data model can facilitate nested structures, thereby mitigating deficiencies associated with data models that employ flat namespaces. The structure 1000 includes an enterprise level 1002, where a particular enterprise can be represented within data structured in accordance with a hierarchical data model. Beneath the enterprise level 1002 level can be a site level 1004, so that a particular factory (site) within an enterprise can be represented within a data packet. Beneath the site level 1004 an area level 1006 can exist, which specifies an area within the factory that relates to the data. A line level 1008 can lie beneath the area level 1006, wherein the line level 1008 is indicative of a line associated with particular data. Beneath the line level 1008 a workcell level 1010 can exist, thereby indicating a workcell associated with the data. Utilizing a nested, hierarchical data model, PLCs can become more aware of data associated therewith. Furthermore, the hierarchy 1000 can be customized by an owner of such hierarchy. For instance, more granular objects/levels can be defined within the hierarchy 1000. Use of such a robust data model enables patterns to be discerned within unfiltered data to be recognized and output efficiently.

Figure 11:
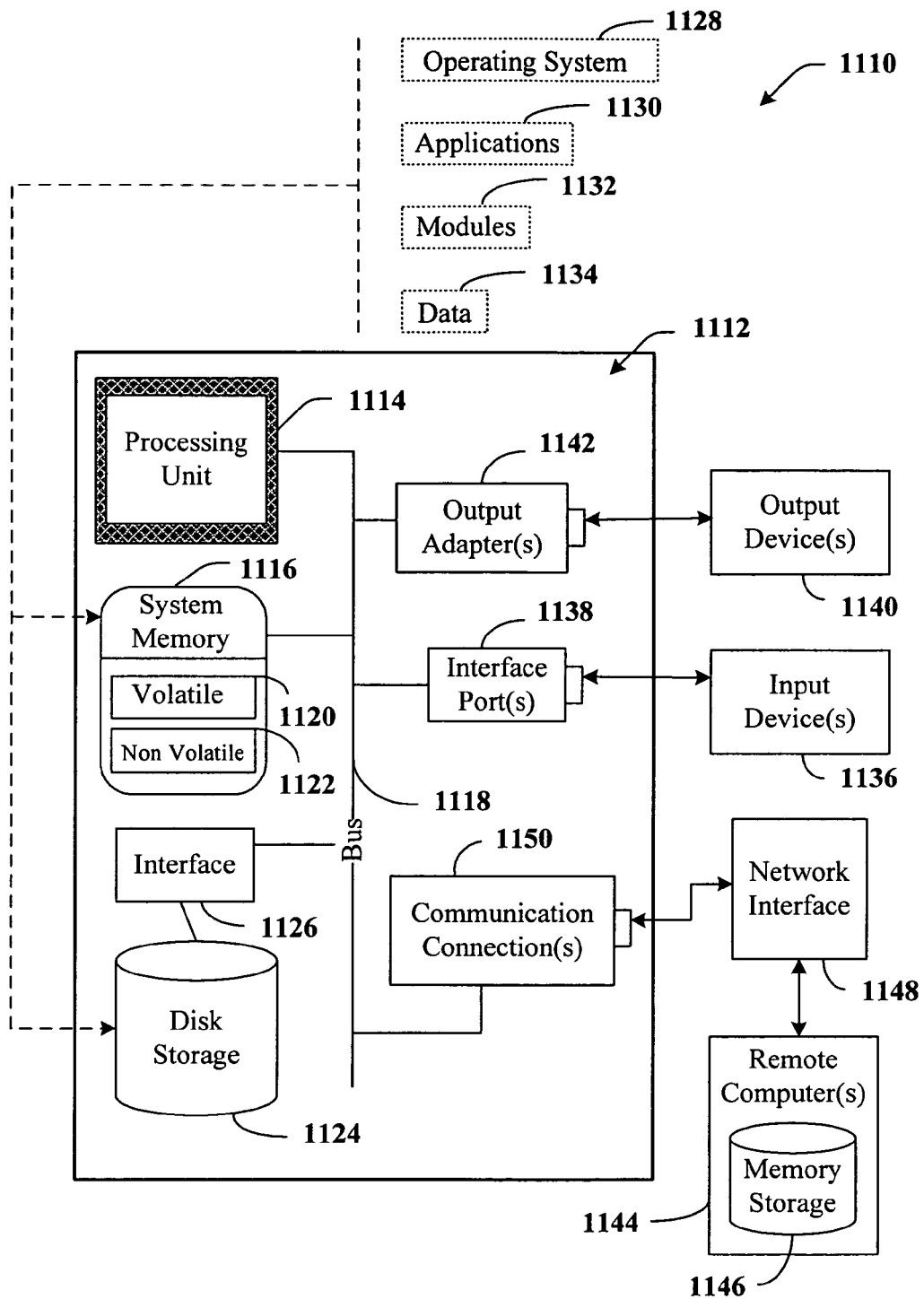
FIG. 11 is an exemplary computing environment that can be utilized in connection with the claimed subject matter.

With reference to FIG. 11, an exemplary environment 1110 for implementing various aspects of the claimed subject matter, including performing data mining on aggregated data from multiple controllers, includes a computer 1112. The computer 1112 includes a processing unit 1114, a system memory 1116, and a system bus 1118. The system bus 1118 couples system components including, but not limited to, the system memory 1116 to the processing unit 1114. The processing unit 1114 can be any of various available processors. Dual microprocessors and other multiprocessor architectures also can be employed as the processing unit 1114.

The system bus 1118 can be any of several types of bus structure(s) including the memory bus or memory controller, a peripheral bus or external bus, and/or a local bus using any variety of available bus architectures including, but not limited to, 8-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 1116 includes volatile memory 1120 and nonvolatile memory 1122. The basic input/output system (BIOS), containing the basic routines to transfer information between elements within the computer 1112, such as during start-up, is stored in nonvolatile memory 1122. By way of illustration, and not limitation, nonvolatile memory 1122 can include read only memory (ROM), programmable ROM (PROM), electrically programmable ROM (EPROM), electrically erasable PROM (EEPROM), or flash memory. Volatile memory 1120 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1112 also includes removable/non-removable, volatile/non-volatile computer storage media. FIG. 11 illustrates, for example a disk storage 1124. Disk storage 1124 includes, but is not limited to, devices like a magnetic disk drive, floppy disk drive, tape drive, Jaz drive, Zip drive, LS-100 drive, flash memory card, or memory stick. In addition, disk storage 1124 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1124 to the system bus 1118, a removable or non-removable interface is typically used such as interface 1126.

It is to be appreciated that FIG. 11 describes software that acts as an intermediary between users and the basic computer resources described in suitable operating environment 1110. Such software includes an operating system 1128. Operating system 1128, which can be stored on disk storage 1124, acts to control and allocate resources of the computer system 1112. System applications 1130 take advantage of the management of resources by operating system 1128 through program modules 1132 and program data 1134 stored either in system memory 1116 or on disk storage 1124. It is to be appreciated that the subject invention can be implemented with various operating systems or combinations of operating systems.

A user enters commands or information into the computer 1112 through input device(s) 1136. Input devices 1136 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1114 through the system bus 1118 via interface port(s) 1138. Interface port(s) 1138 include, for example, a serial port, a parallel port, a game port, and a universal serial bus (USB). Output device(s) 1140 use some of the same type of ports as input device(s) 1136. Thus, for example, a USB port may be used to provide input to computer 1112, and to output information from computer 1112 to an output device 1140. Output adapter 1142 is provided to illustrate that there are some output devices 1140 like monitors, speakers, and printers, among other output devices 1140, which require special adapters. The output adapters 1142 include, by way of illustration and not limitation, video and sound cards that provide a means of connection between the output device 1140 and the system bus 1118. It should be noted that other devices and/or systems of devices provide both input and output capabilities such as remote computer(s) 1144.

Computer 1112 can operate in a networked environment using logical connections to one or more remote computers, such as remote computer(s) 1144. The remote computer(s) 1144 can be a personal computer, a server, a router, a network PC, a workstation, a microprocessor based appliance, a peer device or other common network node and the like, and typically includes many or all of the elements described relative to computer 1112. For purposes of brevity, only a memory storage device 1146 is illustrated with remote computer(s) 1144. Remote computer(s) 1144 is logically connected to computer 1112 through a network interface 1148 and then physically connected via communication connection 1150. Network interface 1148 encompasses communication networks such as local-area networks (LAN) and wide-area networks (WAN). LAN technologies include Fiber Distributed Data Interface (FDDI), Copper Distributed Data Interface (CDDI), Ethernet/IEEE 1102.3, Token Ring/IEEE 1102.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1150 refers to the hardware/software employed to connect the network interface 1148 to the bus 1118. While communication connection 1150 is shown for illustrative clarity inside computer 1112, it can also be external to computer 1112. The hardware/software necessary for connection to the network interface 1148 includes, for exemplary purposes only, internal and external technologies such as, modems including regular telephone grade modems, cable modems and DSL modems, ISDN adapters, and Ethernet cards.

Figure 12:
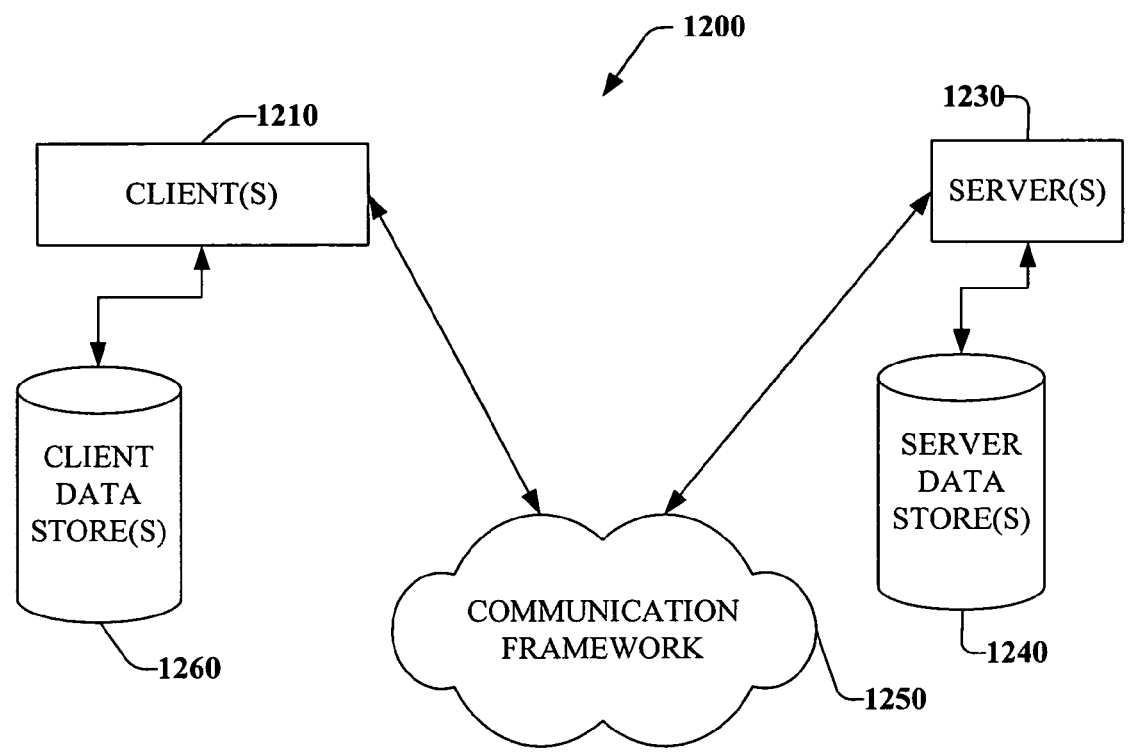
FIG. 12 is an exemplary networking environment that can be utilized in connection with the claimed subject matter.

FIG. 12 is a schematic block diagram of a sample-computing environment 1200 with which the subject invention can interact. The system 1200 includes one or more client(s) 1210. The client(s) 1210 can be hardware and/or software (e.g., threads, processes, computing devices). The system 1200 also includes one or more server(s) 1230. The server(s) 1230 can also be hardware and/or software (e.g., threads, processes, computing devices). The servers 1230 can house threads to perform transformations by employing the subject invention, for example. One possible communication between a client 1210 and a server 1230 can be in the form of a data packet adapted to be transmitted between two or more computer processes. The system 1200 includes a communication framework 1250 that can be employed to facilitate communications between the client(s) 1210 and the server(s) 1230. The client(s) 1210 are operably connected to one or more client data store(s) 1260 that can be employed to store information local to the client(s) 1210. Similarly, the server(s) 1230 are operably connected to one or more server data store(s) 1240 that can be employed to store information local to the servers 1230.

What has been described above includes examples of the claimed subject matter. It is, of course, not possible to describe every conceivable combination of components or methodologies for purposes of describing the claimed subject matter, but one of ordinary skill in the art may recognize that many further combinations and permutations are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A data analysis system comprising the following computer-executable components:
    an aggregation component that aggregates data from multiple controllers on a factory floor to yield aggregated data;
    an analysis component that automatically performs data mining on the aggregated data and determines at least one of correlations between variables within the aggregated data or trends within the aggregated data; and
    a simulation engine that simulates at least one industrial process associated with at least a subset of the multiple controllers and generates at least one prediction relating to future operation of the at least one industrial process, wherein results of the data mining undertaken by the analysis component are employed to update the simulation engine.

2. The system of claim 1, the multiple controllers comprise one or more of at least one programmable logic controller or at least one robotic controller.

3. The system of claim 1, further comprising an updating component that automatically updates a control process based at least in part upon results of the data mining.

4. The system of claim 1, the analysis component comprises a filter component that determines a time range for data to be analyzed based upon time of creation of the data, the analysis component performing data mining on data within the time range determined by the filter component.

5. The system of claim 4, wherein the filter component is associated with a set of rules defining time ranges corresponding to respective events associated with the industrial process, the rules employed to determine the time range for data to be analyzed given an event for which analysis is being performed.

6. The system of claim 1, further comprising a security component that ensures that an individual requesting access to the aggregated data is authorized for the requested access.

7. The system of claim 1, further comprising:
    a data repository that retains at least a portion of the aggregated data; and an audit component that accesses the data repository and generates an audit trail with respect to at least a portion of the aggregated data.

8. The system of claim 7, further comprising an identifier component that determines identities of controllers associated with aggregated data, the audit component configured to generate an audit trail with respect to a particular controller.

9. The system of claim 1, data received from the multiple controllers conforms to a hierarchically structured data model.

10. The system of claim 9, the hierarchically structured data model is based at least in part upon at least one of ISA S88 or ISA S95.

11. The system of claim 1, further comprising an input expander component that automatically determines data to be provided to the analysis component from data retained by the controllers upon occurrence of a predefined event.

12. The system of claim 1, the analysis component comprises a data fusion processor that aids in performing data mining on the aggregated data.

13. The system of claim 1, further comprising a forecasting component that forecasts an event based at least in part upon results of the data mining.

14. The system of claim 1, further comprising a schedule component that determines a time to schedule maintenance of a device based at least in part upon results of the data mining.

15. The system of claim 14, wherein the scheduling component combines the results of the data mining with information regarding at least one of availability of maintenance personnel, current work orders, or identity of maintenance personnel to yield combined data, and determines the time to schedule maintenance of the device based on the combined data.

16. The system of claim 1, wherein the analysis component determines actual source of an error or an alarm based upon data mining on the aggregated data from multiple controllers.

17. The system of claim 1, wherein the aggregation component determines a data storage capacity associated with each of the controllers.

18. The system of claim 17, wherein the aggregation component pulls data from a controller upon utilization of a threshold percentage of data storage capacity of a controller.

19. The system of claim 1, wherein the results of the data mining comprise at least a trend detected in the industrial process, and the simulation engine is updated in accordance with the trend.

20. A methodology for analyzing an industrial process, comprising:
configuring a data repository to receive unfiltered data from a plurality of controllers;
configuring at least one processing entity to automatically search at least a subset of the received data to locate at least one of patterns or trends in the data;
employing a simulation engine to simulate the industrial process and to generate at least one prediction relating to future operation of the industrial process;
providing the at least one of patterns or trends to the simulation; and
configuring the simulation engine to utilize the at least one of the patterns or trends in connection with updating the simulation engine.

21. The methodology of claim 20, further comprising configuring the processing entity to determine correlations between variables within the data.

22. The methodology of claim 20, wherein the configuring at least one processing entity comprises:
defining a set of rules defining time ranges corresponding to respective events associated with the industrial process; and
configuring the at least one processing entity to search a subset of the unfiltered data corresponding to a time range associated with an event being analyzed in accordance with the set of rules.

23. The methodology of claim 20, further comprising associating the processing entity with a security application, the security application configured to prohibit access to results of the data mining and data mining algorithms to authorized individuals.

24. The methodology of claim 20, further comprising generating an audit trail based upon data received from the plurality of controllers, at least one of the plurality of controllers is a programmable logic controller.

25. The methodology of claim 20, the processing entity is a data fusion processor.

26. A methodology for analyzing a control process, comprising:
simulating the control process using a simulation engine that generates at least one prediction relating to future operation of the industrial process;
aggregating raw data from a plurality of programmable logic controllers to yield aggregated data;
automatically performing data mining on the aggregated data to determine correlations between variables within the aggregated data;
determining a root cause of an alarm based upon the data mining on the aggregated data;
automatically updating the control process based at least in part upon results of the data mining;
providing results of the data mining to the simulation engine; and
updating the simulation engine in accordance with the results of the data mining.

* * * * *